United States Patent
Hunter et al.

(12) 
(10) Patent No.: US 6,863,322 B2
(45) Date of Patent: Mar. 8, 2005

(54) MOTOR VEHICLE BUMPER

(76) Inventors: Frederick D. Hunter, 5054 June Dr., Almont, MI (US) 48003; Paul Lafata, 48055 Mallard, Chesterfield, MI (US) 48047

( * ) Notice: Subject to any disclaimer, the term of this patent is extended or adjusted under 35 U.S.C. 154(b) by 0 days.

(21) Appl. No.: 10/297,153
(22) PCT Filed: May 31, 2001
(86) PCT No.: PCT/US01/17433
§ 371 (c)(1), (2), (4) Date: May 19, 2003
(87) PCT Pub. No.: WO01/92064
PCT Pub. Date: Dec. 6, 2001

(65) Prior Publication Data
US 2004/0017089 A1 Jan. 29, 2004

Related U.S. Application Data
(60) Provisional application No. 60/208,146, filed on May 31, 2000.

(51) Int. Cl.$^7$ ............................................. B29C 45/16
(52) U.S. Cl. .................. 293/120; 293/132; 264/255
(58) Field of Search .................................. 293/102, 109, 293/120, 123, 132, 133, 136; 264/266, 267, 269, 255; 428/35.7

(56) References Cited

U.S. PATENT DOCUMENTS

| | | | |
|---|---|---|---|
| 4,029,350 A | 6/1977 | Goupy et al. | 293/71 R |
| 5,139,297 A | 8/1992 | Carpenter et al. | 293/132 |
| 5,385,375 A | 1/1995 | Morgan et al. | 293/109 |
| 5,780,129 A | 7/1998 | Ohta | 428/35.7 |

*Primary Examiner*—Lori L. Coletta
(74) *Attorney, Agent, or Firm*—Grossman, Tucker, Perreault & Pfleger

(57) ABSTRACT

A motor vehicle bumper system comprising an outer shell (10) of an automotive bumper having an inner surface (18) generally oriented toward the vehicle. The outer shell comprises a plurality of energy absorbing protuberances (14) extending inwardly from the inner surface of the outer shell. The energy absorbing protuberances may be formed from an energy absorbing material, such as a polymeric foam, and/or may additionally comprise indentations extending into the body of the protuberance to enhance the energy absorbing characteristics of the protuberance.

9 Claims, 2 Drawing Sheets

MOTOR VEHICLE BUMPER

CROSS REFERENCE TO RELATED APPLICATIONS

Figure 1:
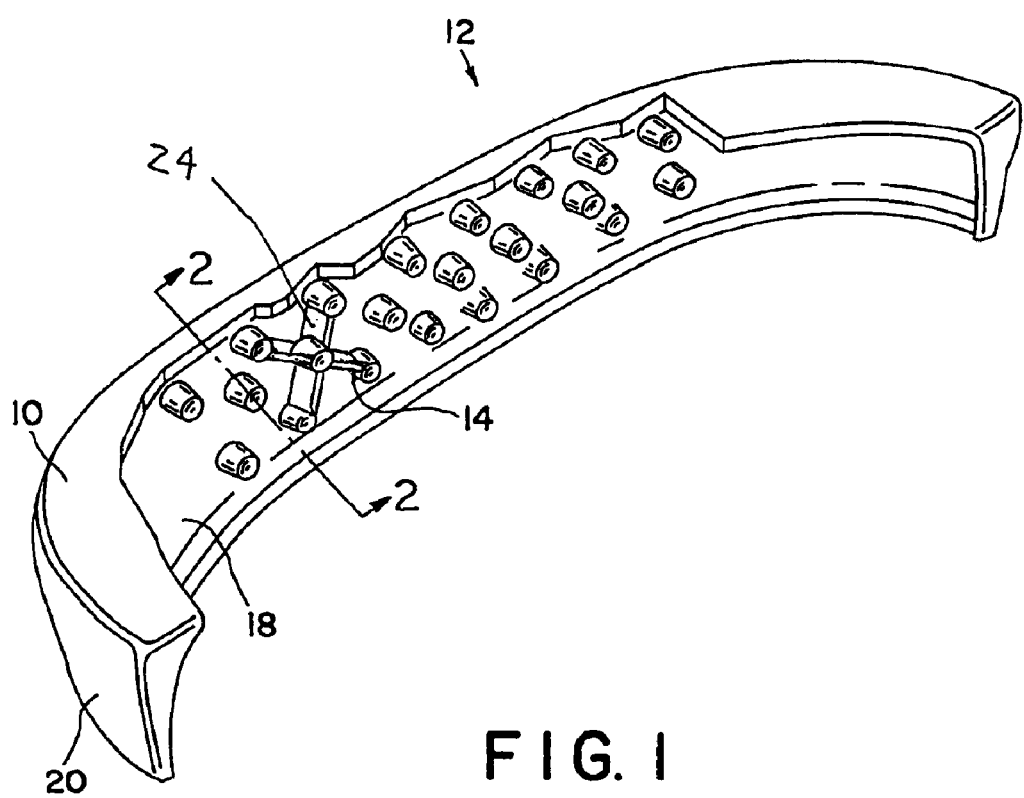

This application is the National Stage of International Application No. PCT/US01/17433 filed May 31, 2001 and published Dec. 6, 2001 as International Publication No. WO 01/92064, designating the United States, and which claims benefit of U.S. Provisional Application No. 60/208,146 filed May 31, 2000.

This invention relates generally to motor vehicle bumper systems, and more particularly, to bumper systems comprising a fascia with integral energy absorbers.

In automotive applications bumpers ore employed not only to control and limit the energy from an impact as it enters the vehicle, typically channeling the energy into structural members of the vehicle, but also to limit the damage to a vehicle as a result of relatively minor accidents, thereby fulfilling the 5 mph impact test. In the past automotive bumpers came in two general varieties.

A first general variety of known bumpers comprises an outer fascia having a layer of energy absorbing foam, typically a polyurethane foam, disposed behind the fascia. The fascia and foam are further attached to a structural bumper beam. According to this first variety of bumper assembly, the fascia provides the cosmetic outer surface viewable from the exterior of the vehicle. Under an impact event, impact energy to the fascia is, to some degree, absorbed or dissipated by the energy absorbing foam material. The bumper beam is designed to absorb the impact and route it to structural components of the vehicle, such as frame rails.

The second general variety of bumper assemblies comprises a fascia, a bumper beam and, usually two, hydraulic or pneumatic piston type shock absorbers. According to this variety of bumper, as with the first variety, the fascia fulfills the aesthetic requirements of the bumper assembly. The bumper beam is typically a metallic member disposed behind, and/or contained within the fascia, for receiving the energy of an impact and channeling the energy to the shock absorbers. The shock absorbers, as with the shocks in the suspension system, absorb and lessen the energy of an impact and transfer the remainder of the energy to structural components of the vehicle, such as frame rails.

The present invention is an automotive bumper system comprising a an outer shell having at least one, but preferably several, energy absorbing features disposed adjacent thereto. The energy absorbing features preferable functionally comprise projections from an inner surface of the outer shell. These energy absorbing features may actually be integral with the inner surface of the outer shell, or may be separate components disposed adjacent to the inner surface of the outer shell. The energy absorbing features may include cones, pyramids, cylinders, or truncated variations of the previous. Additionally, the energy absorbing characteristics of the energy absorbers may be modified by providing them with indentations. The energy absorbers and the outer shell both preferably comprise a polymeric material, although not necessarily the same polymeric material.

Further, the present invention provides a method of making a bumper having energy absorbing features. Preferably the method is a sequential molding operation wherein the outer shell is formed of a polymeric material in a first mold. Subsequently the energy absorbing features are formed integrally with the inner surface of the outer shell using a mold wherein at least a portion of the mold is defined by the previously formed outer shell inner surface. Alternately, the energy absorbing features maybe formed first, and the outer shell formed subsequently thereto. Consistent with this last, as least a portion of the mold forming the inner surface of the outer shell is defined by at least a portion of the previously formed energy absorbers.

In an alternate method of forming the bumper system, the outer shell is formed separately from the energy absorbers. The separately formed outer shell and energy absorbers may subsequently be joined together by methods including thermal bonding, adhesive bonding, solvent welding, mechanical fastening etc.

Figure 2:
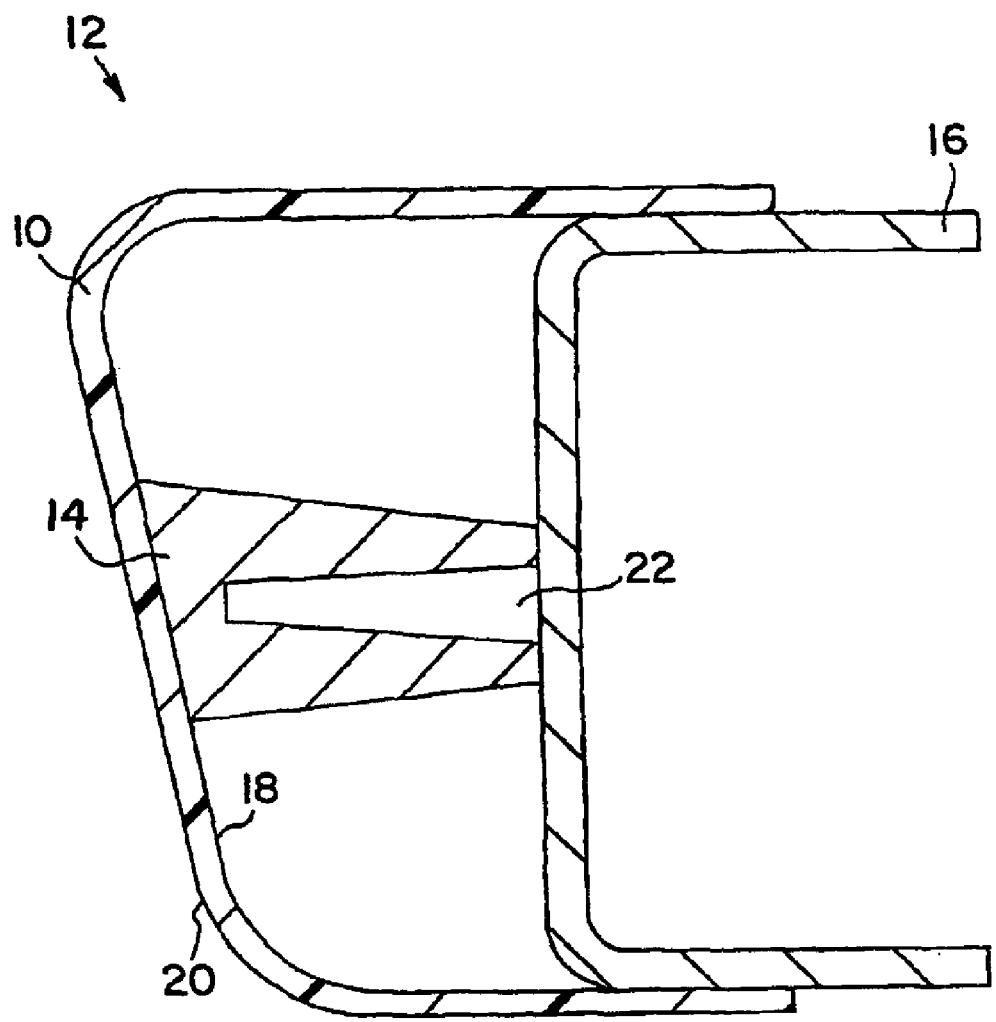

To better understand and appreciate the invention, refer to the following detailed description in connection the accompanying drawings:

FIG. 1 is a rear perspective view of a fascia with the fascia partially cut away to show a pattern of energy absorbers; and FIG. 2 is a cross sectional view of the fascia of FIG. 1 taken along line 2—2.

An exemplary outer shell is shown generally at 10 in FIG. 1. As shown, outer shell 10 is a fascia of a motor-vehicle. As shown in FIG. 2, the outer shell 10 is generally the aesthetic component of a bumper system 12, and covers the internal components of the bumper system 12 including an energy absorber 14 and support structure 16, such as a bumper beam.

Outer shell 10 has an inner surface 18 and an outer surface 20, and comprises a plastic material. At least one, and more preferably a plurality of, energy absorbers 14 are attached to outer shell 10. The energy absorbers 14 comprise isolated protuberances projecting from the inner surface 18 of the outer shell 10. Preferred designs of the energy absorbers 14 comprise cylinders, cones, truncated cones, pyramids, or truncated pyramids.

As shown in FIG. 2, energy absorbers 14 are disposed adjacent the support structure 16 when outer shell 10 is assembled to the vehicle. In the case of an impact to the outer surface 20 of outer shell 10, energy absorbers 14 deform and absorb either the entire impact energy or at least a portion thereof. Optionally, and depending on the magnitude of the impact, the energy absorbers 14 may also transmit energy to the support structure 16.

The energy absorption characteristics of energy absorbers 14 may be modified by providing the energy absorbers 14 with at least one indentation 22, preferably extending from a surface adjacent the support structure towards the inner surface 18 of the outer shell 10, therein providing the energy absorbers 14 with a cored construction.

The energy absorption characteristics of energy absorbers 14 may further be modified by varying the number of, and separation between, energy absorbers 14. Thus, for example, in response to an impact of greater energy, the number of energy absorbers may be increased. It can further be appreciated that the height of energy absorber 14 (i.e. the distance between the surface adjacent the support structure and the inner surface 18 of the outer shell 10), as well as the ratio of cross-sectional area of the surface of energy absorber 14 in contact with inner surface 18 will also alter the energy absorbing characteristics. The energy absorbing characteristics of the energy absorbers 14 may be further modified by connecting the energy absorbers with a rib 24 structure to form an egg crate or grid structure.

Outer shell 10 is preferably formed from a thermoplastic material using a thermoplastic injection molding process. An exemplary thermoplastic material comprises polypropylene (PP). However, outer shell 10 may also be formed from a thermoset material using, for example, a reaction injection molding process. An exemplary thermoset material comprises thermoset polyurethane. Other foxing techniques may include, but are not limited to, injection-compression molding, compression molding, thermoforming, vacuum forming, pressure forming and blow molding. It is preferred that the outer shell 10 be molded in color, thereby obviating the need for post process painting or finishing.

Energy absorbers 14 are preferably formed from an energy absorbing polymer material, more preferably an expanded polymeric foam material. The energy absorbing foam material may comprise a thermoplastic or thermoset polymeric material, and the blowing agent used to foam the polymer may be chemical or physical. Alternately, as noted, energy absorbers 14 may be formed from a solid thermoplastic or thermoset polymeric material. An exemplary thermoplastic material comprises polypropylene (PP), while an exemplary thermoset material comprises thermoset polyurethane. In the case of thermoplastic material, energy absorbers 14 are preferably formed by injection molding. In the case of thermoset materials, energy absorbers 14 are preferably formed by reaction injection molding.

Preferably, outer shell 10 and energy absorbers 14 are manufactured using a sequential two-step molding process. When outer shell 10 and energy absorbers 14 are formed using a sequential two-step molding process, energy absorber 14 are formed from a first polymeric material injected or otherwise introduced, into a first mold cavity comprising the shape of energy absorbers 14. The mold is then adjusted to provide a second mold cavity comprising the shape of the outer shell 10. Outer shell 10 is then formed from a second polymeric material injected into the second mold cavity. Preferably, the inner surface 18 of outer shell 10 bonds to energy absorbers 14 during the molding operation. Alternately, outer shell 10 maybe formed first, and the energy absorbers 14 maybe formed thereafter.

When a sequential molding process is utilized, it is further preferred that a rotatable, or turntable, platen molding apparatus be employed. As result, the outer shell 10 and energy absorbers 14 may be molded using a single, integrated piece of equipment, rather than having to transfer the first molded object to a second piece of molding equipment. When a rotatable platen molding apparatus is used, the first mold cavity comprising the shape of the energy absorbers 14 starts the molding cycle at a first molding station. At the first molding station, polymeric material is introduced into a mold comprising the first mold cavity. Shortly thereafter, the rotatable platen is rotated approximately 120 degrees and the molded energy absorbers 14 are indexed to a second molding station. At the second molding station, polymeric material is introduced into a mold comprising the second mold cavity comprising the outer shell 10. Preferably, the inner surface 18 of outer shell 10 bonds to the energy absorber 14 during or shortly after molding. Shortly thereafter, the rotatable platen is rotated approximately 120 degrees and the formed energy absorbers 14 and outer shell 10 are indexed to a de-mold station where they are removed from the molding operation. Alternately, and again as noted above, the outer shell 10 may be formed in the first mold cavity and the energy absorber 14 maybe formed in the second mold cavity.

Alternately, the outer shell 10 and energy absorbers 14 may be formed in completely separate independent mold operations and, rather than being joined during the formation of the second piece, may be joined subsequently after both pieces are first formed. When outer shell 10 and energy absorbers 14 are separately molded, preferred methods of joining include, but are not limited to, thermal welding, thermal bonding, solvent bonding, mechanical attachment and/or adhesive bonding, as well as combinations thereof.

Alternatively, outer shell 10 and energy absorbers 14 maybe formed at the same time and from the same polymeric material. This will reduce the number of mold cavities required from two to one, and reduce the complexity of the equipment and the molding operation.

As can therefore be seen from the above, various modifications can be applied to the invention herein, without departing from the broad scope of a bumper system containing energy absorbing capabilities.

What is claimed is:

1. An automotive bumper comprising an outer shell having an inner surface and at least one energy absorber, said at least one energy absorber comprising a protuberance disposed adjacent to and projecting from said inner surface of said outer shell, wherein said protuberance is integral with the inner surface of the outer shell.

2. The automotive bumper according to claim 1 wherein said at least one energy absorber comprises at least one indentation extending generally from an energy absorber surface distal said outer shell toward said outer shell.

3. The automotive bumper according to claim 1 comprising a plurality of energy absorbers wherein said plurality of energy absorbers are connected by at least one rib.

4. A method of producing an automotive bumper comprising:

forming a bumper outer shell having an inner surface;

forming at least one energy absorber comprising a protuberance;

joining said at least one energy absorber to said inner surface of said outer shell such that said at least one energy absorber extends from said inner surface of said outer shell, wherein said protuberance is integral with the inner surface of the outer shell.

5. A method of producing an automotive bumper comprising:

providing a mold cavity defining an outer shell having an inner surface said inner surface having at least one energy absorber projecting therefrom, wherein said protuberance is integral with the inner surface of the outer shell;

introducing a polymeric material into said mold cavity; and at least partially solidifying said polymeric material.

6. A method of producing an automotive bumper comprising;

providing a first mold cavity defining an outer shell having an inner surface;

introducing a first polymeric material into said first mold cavity;

at least partially solidifying said first polymeric material;

adjusting said first mold cavity to provide a second mold cavity defining at least one energy absorber, said at least one energy absorber at least partially defined by said at least partially solidified inner surface of said outer shell;

introducing a second polymeric material into said second mold cavity; and at least partially solidifying said second polymeric material.

7. The method according to claim 6 wherein the step of adjusting said first mold cavity to provide a second mold cavity comprises rotating a portion of said first mold cavity and indexing said portion of said first mold cavity with said second mold cavity.

8. A method of producing an automotive bumper comprising;

provising a first mold cavity defining at least one energy absorber;

introducing a first polymeric material into said first mold cavity;

at least partially solidifying said first polymeric material;

adjusting said first mold cavity to provide a second mold cavity defining an outer shell having an inner surface, wherein at least a portion of said inner surface of said outer shell is defined by at least a portion of said at least one energy absorber;

introducing a second polymeric material into said second mold cavity; and at least partially solidifying said second polymeric material.

9. The method according to claim 8 wherein the step of adjusting said first mold cavity to provide a second mold cavity comprises rotating a portion of said first mold cavity and indexing said portion of said first mold cavity with said second mold cavity.

* * * * *